United States Patent Office 3,432,464
Patented Mar. 11, 1969

3,432,464
POLYHYDROXY AROMATIC COMPOUNDS IN POLYAMIDE CEMENTS AS ADHESION PROMOTERS
Chester W. Fitko and Abraham Ravve, Chicago, Ill., assignors to Continental Can Company, Inc., New York, N.Y., a corporation of New York
No Drawing. Filed Dec. 27, 1966, Ser. No. 604,664
U.S. Cl. 260—47    11 Claims
Int. Cl. C09j 3/16; B32b 15/00

ABSTRACT OF THE DISCLOSURE

An adhesive is prepared by admixing a synthetic linear polyamide of the nylon type with a small amount of the reaction product of an aromatic polyhydroxy carboxylic acid and an aliphatic diamine and heating the admixture to an elevated temperature for a time sufficient to permit reaction between the polyamide and the aromatic polyhydroxy carboxylic acid-aliphatic diamine reaction product.

BACKGROUND OF INVENTION

Field of invention

The present invention relates to a composition and method for bonding adjacent surfaces to one another by means of a synthetic resin adhesive and more particularly refers to a composition and method of forming high-strength metal-to-metal bonds using a synthetic linear polyamide adhesive which affords an adhesive joint of greatly increased peel strength.

The prior art

Because of their high chemical inertness and high tensile strength, synthetic linear polyamides of the nylon type are very desirable as organic adhesives for the cementing of various surfaces, principally metal. However, a deficiency common to all of these polyamides is their poor adhesion to most, if not all, metal surfaces.

Summary of the invention

The deficiencies of the prior art have been overcome in accordance with the present invention wherein a synthetic linear polyamide resin having improved adhesion is obtained by admixing a synthetic linear polyamide of the nylon type (as hereinafter defined) with the reaction product of an aromatic polyhydroxy carboxylic acid and an aliphatic diamine, and heating the admixture to an elevated temperature for a time sufficient to allow the aromatic polyhydroxy carboxylic acid and aliphatic diamine reaction product to interact with the polyamide.

The nylon compositions prepared in accordance with the present invention are well-suited as bonding materials for interfolding side seams of sheet metal containers including uncoated steel, that is, black iron plate, and steel having an organic or metal, e.g., enamel or tin, coating thereover. Excellent bonds are also produced between other metal surfaces such as copper, bronze, and aluminum surfaces. The adhesive strength of the resin compositions to metals are sufficiently great to enable these compositions to be a satisfactory substitute for metallic solder as the bonding agent in the side seam of a metal can.

PREFERRED EMBODIMENTS

Aromatic polyhydroxy carboxylic acids which may be employed in the process of the present invention are carboxylic acids having the general structural formula

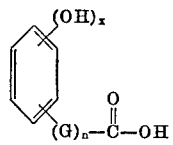

wherein G is a divalent aliphatic group containing 1 to 4 carbon atoms and $n$ is an integer from 0 to 1 and $x$ is an integer from 2 to 4.

Typical examples of aromatic polyhydroxy carboxylic acids which may be employed in preparing the polyamide adhesives of the present invention include 2,3-dihydroxybenzoic acid (pyrocatechuic acid), 2,4-dihydroxybenzoic acid ($\beta$-resorcylic acid), 2,5-dihydroxybenzoic acid (gentisic acid), 2,6-dihydroxybenzoic acid ($\gamma$-resorcylic acid), 3,4-dihydroxybenzoic acid (protocatechuic acid), 2,3,4-trihydroxybenzoic acid (4-pyrogallol carboxylic acid), 2,4,5-trihydroxybenzoic acid (4-hydroxy gentisic acid), 2,4,6-trihydroxybenzoic acid (phloroglucinol carboxylic acid), 3,4,5-trihydroxybenzoic acid (gallic acid), and 2,3,4,5-tetrahydroxybenzoic acid, 3,4-dihydroxyphenyl acetic acid, 3,4-dihydroxyphenyl propionic acid, 3,4-dihydroxyphenyl butyric acid, and 3,4-dihydroxyphenyl pentanoic acid.

The aliphatic diamines which may be used to prepare the adhesive compositions of the present invention have the general formula

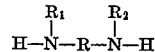

wherein R is an alkylene group containing at least 2 and preferably from 2 to 12 carbon atoms, and $R_1$ and $R_2$ are hydrogen atoms or monovalent aliphatic radicals. Examples of suitable diamines within the scope of the present invention include ethylene diamine, trimethylene diamine, tetramethylene diamine, pentamethylene diamine, hexamethylene diamine, heptamethylene diamine, octamethylene diamine, decamethylene diamine, dodecamethylene diamine. Other diamines include 1,2 diaminopropane, 1,2 diaminobutane, 1,3 diaminobutane, the cyclohexane diamines, piperazine, 3-methyl-hexamethylene diamine, N, N' dimethylhexamethylene diamine, N,N' diethylhexamethylene diamine, N,N' diethylethylene diamine, N,N' dimethyl-trimethylene diamine, N,N' diethylpentamethylene diamine, N,N' dimethyl-octamethylene diamine, N,N' diethyl-decamethylene diamine, 1,12 diamine-octadecane, N,N' dimethyldodecamethylene diamine, N,N' dipropyl-1,3 diaminobutane, N,N' dimethyl-cyclohexane diamine, N,N' dibutyl-3-methylhexamethylene diamine, N,N' diamyl-pentamethylene diamine, N,N' dibutyl-tetramethylene diamine, N-butyl-hexamethylene diamine, N-propyl-trimethylene diamine, and N-amyl-tetramethylene diamine.

By the expression "synthetic linear polyamide of the nylon type" is meant a long-chain synthetic polymeric amide which has recurring amide groups as an integral part of the main polymer chain having the structure

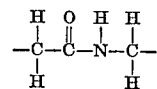

separated by alkylene groups containing at least 2 carbon atoms, and having an intrinsic viscosity of 0.1 or more. Intrinsic viscosity is defined in U.S. Patent 2,130,948.

Among the polyamides which are useful in the present invention are polypentamethylene sebacamide, polyhexamethylene adipamide (nylon 66), polyhexamethylene nonanamide (nylon 69), polyhexamethylene sebacamide (nylon 610), polydecamethylene adipamide, polydecamethylene sebacamide, poly-m-phenylene sebacamide, polycapro amide (nylon 6), poly-7-heptanoamide (nylon 7), poly-11-undecanoamide (nylon 11), polylauryl lactam (nylon 12), as well as other polyamides and interpolyamides of the types mentioned in U.S. Patents 2,071,253; 2,130,523; and 2,130,948 issued to W. H. Carothers, and U.S. Patent 2,285,009 issued to M. M. Brubaker et al.

The commercially available polyamides of the nylon type melt at temperatures in the order of about 180° to about 260° C.

The aromatic polyhydroxy carboxylic acid-aliphatic diamine reaction product may conveniently be formed by adding the carboxylic acid and diamine in separate amounts to the polyamide. At the elevated temperatures employed for admixing these materials in the polyamide, the aromatic polyhydroxy carboxylic acid and the aliphatic diamine react to form the respective polyhydroxy phenyl diamide with the liberation of water in accordance with Equation I:

(I)

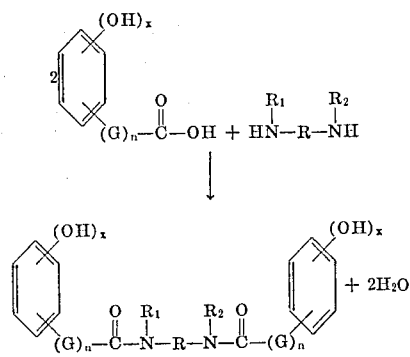

While it is not intended to have the present invention limited to any theory regarding the cause or results obtained by the present invention, it is believed that the improvement in adhesive properties of the polyamide resin is caused by a chemical modification in the polymer chain as a result of an interaction between the aromatic polyhydroxy carboxylic acid-aliphatic diamine reaction product and the polyamide at the elevated temperatures to which the admixture of these materials is subjected.

The presence of the liberated water formed during the formation of the aromatic polyhydroxy carboxylic acid-aliphatic diamine reaction product permits an exchange or transamidation reaction to occur between the diamide reaction product which forms in accordance with Equation I, and the polyamide polymer chain wherein the resultant polymer product will contain the polyhydroxy phenyl diamide in the backbone chain in accordance with Equation II:

(II)

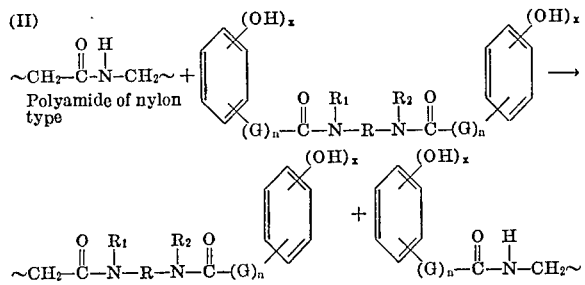

The amount of aromatic polyhydroxy carboxylic acid and aliphatic diamine reaction product added to the polyamide may be varied over a fairly wide range without departing from the spirit of the invention. Thus, the combined total amount of the carboxylic acid and aliphatic diamine incorporated in the polyamide may range from about 0.5% to about 5% based on the weight of the polyamide, and especially desirable results are obtained when the percent total of both components varies from about 1 to about 3 weight percent.

Since these components, due to transamidation, become part of the final nylon polymer, the polymer should be substantially free of any unreacted carboxylic acids or diamines. Therefore, although the relative molar ratios of the carboxylic acid-to-diamine in the reaction product incorporated in the polyamide are not critical, a molar ratio of acid-to-diamine in the amide reaction product of substantially 2:1 is preferred so as to avoid the presence of unreacted acid or diamine in the polymer and the deleterious effects which accompany such presence.

As would be obvious to one skilled in the art, instead of adding the aromatic polyhydroxy carboxylic acid and aliphatic diamine in separate amounts to form the diamide reaction product, equivalent results may be obtained by adding the salt formed by the reaction of an aromatic polyhydroxy carboxylic acid and aliphatic diamine or the amide formed by the reaction of the aromatic polyhydroxy carboxylic acid and the aliphatic diamine together with a small amount of water to the polyamide and heating the mixture to a temperature at which transamidation occurs.

The aromatic polyhydroxy carboxylic acid-aliphatic diamine reaction product is incorporated in the nylon resin by first homogenously admixing, by any means known to the art, the separate reaction product components, the salt thereof, or the diamide, and the nylon resin. The physical admixture is then heated to a temperature of about 195° to about 270° C. and most preferably to a temperature within that range above the melting point of the particular nylon resin used.

The heated mixture is subjected to agitation to insure a homogenous blend and the surface of the mixture is preferably maintained under an inert atmosphere to prevent oxidative deterioration. Satisfactory blending can be accomplished at temperatures in the approximate range of 190° to 300° C. and preferably within the approximate range of 200° to 260° C. If blending is done below 190° C., the components lack sufficient fluidity for intimate mixing. During the mixing operation, it is necessary only to allow sufficient time to insure a homogenous blend which in turn will insure complete reaction of the components. The time required for the reaction is dependent upon the temperature of blending and the efficiency of the agitation, and generally ranges from about 3 to about 60 minutes.

After the components are admixed for a time sufficient to insure complete reaction, the reaction mass is allowed to cool, and in this form is suitable for use as an adhesive.

One method of effecting adhesion using the modified polyamide resin adhesive of the present invention consists in applying a thin film of the resin particles to the surface of one of the metal elements to be joined, the metal element having been heated to a temperature above the melting point of the resin to tactify the polyamide resin. The second metal element is then applied to the tactified first metal surface and the assembly thus formed is subjected to a temperature at least sufficient to melt the modified polyamide resin and a pressure at least sufficient to hold the assembly together for a time sufficient to allow the modified polyamide resin to wet both opposing metallic surfaces, after which the assembly is allowed to cool and the pressure is released. It is found that by this method, a reasonably strong joint of greatly increased strength is obtained.

To illustrate the manner in which the invention may be carried out, the following examples are given. It is to be understood, however, that the examples are for the purpose of illustration, and the invention is not to be regarded as limited to any of the specific materials or conditions recited therein. Unless otherwise stated, all percentages cited in the examples below are based on weight.

Example I

To 9.58 parts of polylauryl lactam (nylon 12) was added 0.31 part of 3,5 dihydroxybenzoic acid and 0.11 part of hexamethylene diamine, the molar ratio of the acid-to-amine being 2:1, and the total amount of the acid and amine added to the nylon 12 was 4.2%. The mixture of ingredients was heated in a nitrogen atmosphere to 220° C. at which temperature the mixture became molten. The admixture was maintained at this temperature for 1 hour, after which time the admixture was allowed to cool to room temperature.

The product prepared above was spread into a thin film over a one-inch square area at one end of a 1" x 6" x 5 mil strip of an epoxyphenol-enamel coated black iron strip which had been previously heated to 246° C. After cooling, another 1" x 6" x 5 mil strip was positioned over the adhesive film surface of the first strip and the strip assembly was reheated to 246° C. under light pressure to insure intimate contact of the adhesive resin with the metal strips. The heating at 246° C. was continued for a period of approximately 5 seconds, during which time the adhesive product between the strips became molten. The strip assembly was then cooled, and the peel strength of the assembly was determined.

The peel strength of the assembly, i.e., a measure of the load required to peel apart the adhered joint, was determined by pulling the bonded strips apart at an angle of 180° to the bond in an Instron machine at a rate of 0.5 inch per minute.

The above procedure was repeated with the exception that in separate runs, 3,4-dihydroxybenzoic acid, 3,4-dihydroxyphenyl acetic acid, and 3,4,5-trihydroxybenzoic acid were substituted for 3,5-dihydroxybenzoic acid and were incorporated together with hexamethylene diamine in nylon 12 at a molar ratio of 2:1.

For purposes of comparison, the peel strength of a strip assembly bonded with an unmodified nylon 12 resin and a strip assembly bonded with a nylon 12 resin modified in accordance with the procedure of the example with the exception that a monohydroxy phenyl carboxylic acid, o-hydroxybenzoic acid, and p-hydroxybenzoic acid were substituted in place of the polyhydric acids used in the above example, and was incorporated along with hexamethylene diamine at a similar molar ratio of 2:1.

The peel strength of the strip assemblies prepared above are summarized in Table I below.

TABLE I

| Test No. | Aromatic polyhydroxy carboxylic acid | Percent additive (acid and diamine) in nylon 12 | Peel strength (lbs./linear in. avg. 3 runs) |
|---|---|---|---|
| 1 | 3,5 dihydroxybenzoic acid | 4.2 | 18.3 |
| 2 | 3,4 dihydroxybenzoic acid | 4.2 | 29.3 |
| 3 | 3,4 dihydroxyphenyl acetic acid | 4.9 | 14.0 |
| 4 | 3,4,5 trihydroxybenzoic acid | 4.6 | 23.6 |
| C$_1$ | None | None | 2.0 |
| C$_2$ | o-Hydroxybenzoic acid | 3.9 | 1.7 |
| C$_3$ | p-Hydroxybenzoic acid | 3.9 | 7.6 |

By referring to the table, it is at once apparent that steel bonded with polyamide resins of the nylon type modified in accordance with the present invention (Test Nos. 1 through 4) have substantially greater peel strengths when compared to the peel strengths of steel assemblied bonded by the same method using an unmodified nylon 12 resin (Test No. C$_1$) or using in combination equivalent amounts of an aliphatic diamine and a phenol carboxylic acid outside the scope of the present invention (Test Nos. C$_2$ and C$_3$).

By way of further comparison, a steel strip assembly bonded in accordance with the procedure of the example, with the exception that the nylon 12 resin had been modified by incorporating 3% by weight 3,4 dihydroxybenzoic acid in the resin without any addition of an aliphatic diamine, was found to have a peel strength of 2.3 lbs./linear in.

Example II

To a solution of 34.0 grams of 3,4,5-trihydroxybenzoic acid dissolved in 150 milliliters of absolute ethanol was added, slowly with vigorous agitation, a solution of 11.9 grams of hexamethylene diamine dissolved in 50 milliliters of absolute ethanol. After reacting, the mixture was allowed to cool to room temperature. The reaction product, the 3,4,5-trihydroxybenzoic acid-hexamethylene diamine salt, was filtered from the ethanol solution and allowed to dry in air at room temperature.

The dried salt was then admixed with various nylon resins in accordance with the procedure of Example I, and the so-modified resins were used as adhesives to bond black iron strips coated with an epoxy phenolic enamel also in accordance with the procedure of Example I.

The peel strengths of the metal assemblies bonded with these modified nylon resins are recorded in Table II below. Control tests, designated by the symbol C in which the unmodified nylon resin (i.e., no salt added to nylon) was used as an adhesive, were also run to illustrate, by comparison, the substantial increase in peel strength obtained by modifying nylon resins in accordance with the process of the present invention.

TABLE II

| Test No. | Nylon | Percent trihydroxybenzoic acid-hexamethylene diamine salt added to nylon | Peel strength (lbs./linear in. avg. 3 runs) |
|---|---|---|---|
| 5 | 610 | 3.0 | 20.3 |
| 6 | 610 | 1.0 | 23.6 |
| 7 | 610 | 0.5 | 4.3 |
| C$_4$ | 610 | 0.0 | 1.0 |
| 8 | 12 | 5.0 | 26.0 |
| 9 | 12 | 3.0 | 21.0 |
| 10 | 12 | 1.0 | 24.0 |
| C$_5$ | 12 | 0.0 | 2.0 |
| 11 | 69 | 3.0 | 29.7 |
| 12 | 69 | 1.0 | 8.7 |
| C$_6$ | 69 | 0.0 | 2.0 |
| 13 | 11 | 1.0 | 28.3 |
| C$_7$ | 11 | 0.0 | 22.5 |

Example III

The 3,4,5 trihydroxybenzoic acid-hexamethylene diamine salt prepared in Example II was admixed with nylon 610 at a concentration of 1% by weight in accordance with the procedure of Example I. The modified nylon 610 resin was used as an adhesive to bond a variety of uncoated metal strips together in accordance with the procedure of Example I.

The peel strengths of the metal assemblies bonded with the modified nylon 610 resin are summarized in Table III below (Tests 14 through 17). Control tests designated by the symbol C, in which the unmodified nylon 610 resin (i.e., no salt added to nylon) was used as an adhesive, were also run to illustrate, by comparison, the substantial increase in peel strength obtained by modifying nylon resins in accordance with the process of the present invention.

TABLE III

| Test No. | Uncoated metal | Peel strength (lbs./linear in. avg. 3 runs) |
|---|---|---|
| 14 | Black iron | 31.3 |
| C$_8$ | do | 12.6 |
| 15 | Steel (chromium plated) | 27.0 |
| C$_9$ | do | 15.0 |
| 16 | Copper | 6.7 |
| C$_{10}$ | do | 3.0 |
| 17 | Brass | 10.0 |
| C$_{11}$ | do | 4.3 |

Results similar to the foregoing examples may also be obtained when any of the other mentioned aromatic polyhydroxy carboxylic acids and aliphatic diamines are utilized in a similar manner in place of those set forth in the above example.

What is claimed is:

1. A process for improving the adherent properties of a synthetic linear polyamide consisting essentially of recurring amide groups as an integral part of the main polymer chain having the structure

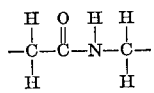

separated by alkylene groups containing at least 2 carbon atoms, and having an intrinsic viscosity of 0.1 or more which comprises admixing the polyamide with the reaction product of an aromatic polyhydroxy carboxylic acid having the formula

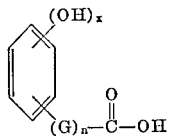

wherein G is a divalent aliphatic group containing 1 to 4 carbon atoms, $n$ is an integer from 0 to 1, and $x$ is an integer from 2 to 4, and an aliphatic diamine having the formula

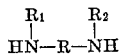

wherein R is an alkylene group containing at least 2 carbon atoms, $R_1$ and $R_2$ are selected from the group consisting of hydrogen and monovalent aliphatic radicals, heating the admixture to an elevated temperature for a time sufficient for the carboxylic acid and diamine to interact with the polyamide chain.

2. The process of claim 1 wherein the admixture is heated to a temperature of about 195° to about 270° C.

3. The process of claim 1 wherein the aromatic polyhydroxy carboxylic acid and the aliphatic diamine are added in separate amounts to the polyamide and the admixture is heated to about 195° to about 270° C. to prepare the reaction product.

4. The process of claim 1 wherein the aromatic polyhydroxy carboxylic acid-aliphatic diamine reaction product is added to the polyamide in the form of a salt.

5. The process of claim 1 wherein the carboxylic acid and the diamine are incorporated in the polyamide at a molar ratio of 2:1.

6. The process of claim 1 wherein the aromatic polyhydroxy carboxylic acid is 3,5 dihydroxybenzoic acid.

7. The process of claim 1 wherein the aromatic polyhydroxy carboxylic acid is 3,4 dihydroxybenzoic acid.

8. The process of claim wherein the aromatic polyhydroxy carboxylic acid is 3,4-dihydroxyphenyl acetic acid.

9. The process of claim 1 wherein the aromatic polyhydroxy carboxylic acid is 3,4,5 trihydroxybenzoic acid.

10. The process of claim 1 wherein the diamine is hexamethylene diamine.

11. The product produced by the process of claim 1.

References Cited

UNITED STATES PATENTS 3,363,027   1/1968   Schnegg et al.

WILLIAM H. SHORT, *Primary Examiner.*

L. L. LEE, *Assistant Examiner.*

U.S. Cl. X.R.

260—78, 857; 161—214